US011949217B1

(12) United States Patent
Ash et al.

(10) Patent No.: US 11,949,217 B1
(45) Date of Patent: Apr. 2, 2024

(54) WIRE CLAMP

(71) Applicant: EcoFasten Solar, LLC, Phoenix, AZ (US)

(72) Inventors: Jon Ash, Walnut Creek, CA (US); John Hudson, Walnut Creek, CA (US); Roger Pedlar, Phoenix, AZ (US); Taylor Ray, Doraville, GA (US)

(73) Assignee: EcoFasten Solar, LLC, Phoenix, AZ (US)

( * ) Notice: Subject to any disclaimer, the term of this patent is extended or adjusted under 35 U.S.C. 154(b) by 0 days.

(21) Appl. No.: 17/948,058

(22) Filed: Sep. 19, 2022

(51) Int. Cl.
*H02G 3/04* (2006.01)
*F16B 2/06* (2006.01)

(52) U.S. Cl.
CPC ........... *H02G 3/0456* (2013.01); *F16B 2/065* (2013.01)

(58) Field of Classification Search
CPC ...... H02G 3/0456; H02G 3/0437; H01R 4/28; H01R 4/44; F16B 2/065
See application file for complete search history.

(56) References Cited

U.S. PATENT DOCUMENTS

| | | | |
|---|---|---|---|
| 3,198,464 A | 8/1965 | Huggins | |
| 5,482,234 A | 1/1996 | Lyon | |
| 6,536,982 B2 | 3/2003 | Gibbons et al. | |
| 9,182,152 B2 | 11/2015 | Hardikar et al. | |
| 9,660,570 B2 | 5/2017 | Stephan et al. | |
| 9,742,350 B2 | 8/2017 | McPheeters | |
| 10,277,158 B2 | 4/2019 | Stephan et al. | |
| 2013/0009019 A1 | 1/2013 | Fukumoto | |
| 2015/0280334 A1 | 10/2015 | McPheeters | |
| 2017/0114928 A1 | 4/2017 | Crounse et al. | |

(Continued)

FOREIGN PATENT DOCUMENTS

| | | | |
|---|---|---|---|
| CN | 206947908 U | * | 1/2018 |
| CN | 215299529 U | * | 12/2021 |

(Continued)

OTHER PUBLICATIONS

Utility Connector, Extruded Aluminum Parallel Groove Clamps, Amazon, on sale to the public as of May 16, 2013, available at https://www.amazon.com/Utility-Connector-Extruded-Aluminum-Parallel/dp/B00CTSWRGG (Year: 2013).*

(Continued)

*Primary Examiner* — Kyle A Cook
(74) *Attorney, Agent, or Firm* — The Webb Law Firm

(57) ABSTRACT

A wire clamp may include a bottom piece having: a first base portion defining a first aperture, an at least partially elliptical barrier extending from the first base portion about the first aperture, and a plurality of legs extending from sides of the first base portion; a top piece having: a second base portion, a protrusion extending from the second base portion, the protrusion defining a second aperture, and a plurality of legs extending from sides of the second base portion; and a fastener. The first aperture and the second aperture may be configured to align and receive the fastener therethrough. A first side of the partially elliptical barrier and a first portion of the plurality of legs may define a first wire channel, and a second side of the partially elliptical barrier and a second portion of the plurality of legs may define a second wire channel.

20 Claims, 9 Drawing Sheets

(56) References Cited

U.S. PATENT DOCUMENTS

2021/0324973 A1* 10/2021 Kranz .................. F16L 3/23
2021/0359643 A1 11/2021 McPheeters et al.

FOREIGN PATENT DOCUMENTS

CN 217062552 U * 7/2022
WO 2021017126 A1 2/2021

OTHER PUBLICATIONS

Utility Connector, One and Two Bolt Aluminum Parallel Groove Clamps with Oxide Inhibitor, Amazon, on sale to the public as of May 16, 2013, available at https://www.amazon.com/Utility-Connector-Aluminum-Parallel-Inhibitor/dp/B00CTSWGPS (Year: 2013).*

* cited by examiner

WIRE CLAMP

BACKGROUND OF THE INVENTION

Field of the Invention

This disclosure relates generally to a wire clamp and, more particularly, to a wire clamp capable of being applied to a rail in a solar panel system to organize and arrange the wires running through the solar panel array.

Description of Related Art

Various wire conduits, clips and clamps have been developed to route and protect wires throughout industrial spaces. However these apparatuses tend to bunch and clamp wires together in such a way that affects their lifespan. They also fail to provide easy access to individuals trying to move the wires for one purpose or another. Thus, there exists a need to provide a mountable wire clamp that can organize wires in such a way that prolongs their lifespan and makes them easier to access or move when organized.

Common methods for managing wires include using zip ties that are commonly made of plastic and have a lifespan that is shorter than the service life of the wires and equipment they are used to support. This can lead to failure of the wire management causing sagging wires that can contact surfaces that can damage the wires and wire insulation such as sharp edges and high heat surfaces. Another common wire management device is wire clips that are typically made of stainless steel and while these do commonly have sufficient lifespan they have other limitations which make them less desirable. They often require the use of many clips which can be expensive and the clips can only manage the wires in a single direction most commonly parallel to the rail or member the clip is attached to. Wires are sometimes managed in such a way that the wire contacts the sharp edges of rails or other cut edges of various materials and structures. The limitations of current wire management solutions creates situations where installers are unable to maintain the minimum required bend radiuses for wires. Thus, there exists a need to provide an affordable, durable, simple and easy to install clamp that can manage single or multiple wires in unlimited direction relative to the structural members the wires are connected to.

SUMMARY OF THE INVENTION

One non-limiting embodiment of the present disclosure may be a wire clamp including a bottom piece having: a first base portion defining a first aperture, an at least partially elliptical barrier extending from the first base portion about the first aperture, and a plurality of legs extending from sides of the first base portion; a top piece having: a second base portion, a protrusion extending from the second base portion, the protrusion defining a second aperture, and a plurality of flanges extending from sides of the second base portion; and a fastener. The first aperture and the second aperture may be configured to align and receive the fastener therethrough. A first side of the at least partially elliptical barrier and a first portion of the plurality of legs may define a first wire channel, and a second side of the at least partially elliptical barrier and a second portion of the plurality of legs may define a second wire channel.

The first wire channel and the second wire channel may be further defined by the second base portion. The protrusion may be at least partially received within the at least partially elliptical barrier. The protrusion may define a third aperture and a fourth aperture. The bottom piece may further include a first post and a second post extending from the first base portion. The first post and the second post may be configured to be received within the third aperture and the fourth aperture.

The first post and the second post may be disposed symmetrically about the first aperture. The segments of the first base portion extending between the at least partially elliptical barrier and the plurality of legs may be ridged. The top piece may be at least partially arched about the bottom piece. The plurality of legs may be sloped in a direction away from the top piece and extend in a direction away from the first base portion. The flanges may include a first portion that is sloped downward in a direction extending away from the second base portion and a second portion that is sloped upward relative to the first portion. The plurality of flanges may correspond to and extend at least partially over the plurality of legs. The wire clamp may include four flanges and four legs, a pair of each corresponding to each corner of the wire clamp.

Another non-limiting embodiment of the present disclosure may be a wire routing system that may include: a rail; and a wire clamp having a bottom piece having: a first base portion defining a first aperture, an at least partially elliptical barrier extending from the first base portion, and a plurality of legs extending from sides of the first base portion; a top piece having: a second base portion and a protrusion extending from the second base portion, the protrusion defining a second aperture; and a self-tapping fastener configured to define a third aperture in the rail. The first aperture, the second aperture, and the third aperture may be configured to align and receive the fastener therethrough, thereby mounting the wire clamp to the rail. A first side of the at least partially elliptical barrier, a first portion of the plurality of legs, and at least a portion of the second base portion of the top piece may define a first wire channel, and a second side of the at least partially elliptical barrier, a second portion of the plurality of legs, and at least a portion of the second base portion of the top piece may define a second wire channel.

The protrusion may be at least partially received within the at least partially elliptical barrier. The protrusion may define a fourth aperture and a fifth aperture. The bottom piece may include a first post and a second post extending from the first base portion, and the first post and the second post may be configured to be received within the fourth aperture and the fifth aperture. The segments of the first base portion extending between the at least partially elliptical barrier and the plurality of legs may be ridged. The top piece may be at least partially arched about the bottom piece. The plurality of legs may be sloped in a direction away from the top piece and extend away from the first base portion.

Another non-limiting embodiment of the present disclosure may be a method of clamping wires, the method having the steps of: placing wires within a first wire channel of a bottom piece, the bottom piece having a first aperture, the first wire channel being defined by a first side of an at least partially elliptical barrier and a first plurality of legs, the at least partially elliptical barrier and the first plurality of legs extending from the bottom piece; placing within a second wire channel of a bottom piece the second wire channel being defined by a second side of the at least partially elliptical barrier and a second plurality of legs, the second plurality of legs extending from the bottom piece; aligning a second aperture defined by a top piece over the first aperture; and extending a fastener through the second aperture and the first aperture, thereby clamping the top piece to the bottom piece. The first aperture is located centrally within the at least partially elliptical barrier.

The top piece may include a protrusion configured to be received at least partially in the at least partially elliptical barrier of the bottom piece, the second aperture being defined in the protrusion. The method may have the additional step of inserting the fastener into a third aperture defined in the rail, thereby securing the top and bottom pieces to the rail.

In some embodiments or aspects, the present disclosure may be characterized by one or more of the following numbered clauses:

Clause 1. A wire clamp comprising: a bottom piece comprising: a first base portion defining a first aperture; an at least partially elliptical barrier extending from the first base portion about the first aperture; and a plurality of legs extending from sides of the first base portion; a top piece comprising: a second base portion; a protrusion extending from the second base portion, the protrusion defining a second aperture; and a plurality of flanges extending from sides of the second base portion; and a fastener, wherein the first aperture and the second aperture are configured to align and receive the fastener therethrough, and wherein a first side of the at least partially elliptical barrier and a first portion of the plurality of legs define a first wire channel.

Clause 2A. The wire clamp of clause 1, wherein the second side of the at least partially elliptical barrier and a second portion of the plurality of legs may define a second wire channel.

Clause 2B. The wire clamp of clause 1 or 2A, wherein the first wire channel and the second wire channel are further defined by the second base portion.

Clause 3. The wire clamp of any of clauses 1-2B, wherein the protrusion is at least partially received within the at least partially elliptical barrier.

Clause 4. The wire clamp of any of clauses 1-3, wherein the protrusion defines a third aperture and a fourth aperture, wherein the bottom piece further comprises a first post and a second post extending from the first base portion, and wherein the first post and the second post are configured to be received within the third aperture and the fourth aperture.

Clause 5. The wire clamp of any of clauses 1-4, wherein the first post and the second post are disposed symmetrically about the first aperture.

Clause 6. The wire clamp of any of clauses 1-5, wherein the segments of the first base portion extending between the at least partially elliptical barrier and the plurality of legs are ridged.

Clause 7. The wire clamp of any of clauses 1-6, wherein the top piece is at least partially arched about the bottom piece.

Clause 8. The wire clamp of any of clauses 1-7, wherein the plurality of legs are sloped in a direction away from the top piece and extend in a direction away from the first base portion.

Clause 9. The wire clamp of any of clauses 1-8, wherein the flanges comprise a first portion that is sloped downward in a direction extending away from the second base portion and a second portion that is sloped upward relative to the first portion.

Clause 10. The wire clamp of any of clauses 1-9, wherein the plurality of flanges correspond to and extend at least partially over the plurality of legs.

Clause 11. The wire clamp of any of clauses 1-10, further comprising four flanges and four legs, a pair of each corresponding to each corner of the wire clamp.

Clause 12. A wire routing system comprising: a rail; and a wire clamp comprising: a bottom piece comprising: a first base portion defining a first aperture; an at least partially elliptical barrier extending from the first base portion about the first aperture; and a plurality of legs extending from sides of the first base portion; a top piece comprising: a second base portion; and a protrusion extending from the second base portion, the protrusion defining a second aperture; and a self-tapping fastener configured to define a third aperture in the rail, wherein the first aperture, the second aperture, and the third aperture are configured to align and receive the fastener therethrough, thereby mounting the wire clamp to the rail, and wherein a first side of the at least partially elliptical barrier, a first portion of the plurality of legs, and at least a portion of the second base portion define a first wire channel, and a second side of the at least partially elliptical barrier, a second portion of the plurality of legs, and at least a portion of the second base portion define a second wire channel.

Clause 13. The wire routing system of clause 12, wherein the protrusion is at least partially received within the at least partially elliptical barrier.

Clause 14. The wire routing system of clause 12 or 13, wherein the protrusion defines a fourth aperture and a fifth aperture, wherein the bottom piece further comprises a first post and a second post extending from the first base portion, and wherein the first post and the second post are configured to be received within the fourth aperture and the fifth aperture.

Clause 15. The wire routing system of any of clauses 12-14, wherein the segments of the first base portion extending between the at least partially elliptical barrier and the plurality of legs are ridged.

Clause 16. The wire routing system of any of clauses 12-15, wherein the top piece is at least partially arched about the bottom piece.

Clause 17. The wire routing system of any of clauses 12-16, wherein the plurality of legs are sloped in a direction away from the top piece and extend away from the first base portion.

Clause 18. A method of clamping wires comprising the steps of: placing wires within a first wire channel of a bottom piece, the bottom piece comprising a first aperture, the first wire channel being defined by a first side of an at least partially elliptical barrier and a first plurality of legs, the at least partially elliptical barrier and the first plurality of legs extending from the bottom piece; placing wires within a second wire channel of a bottom piece, the second wire channel being defined by a second side of the at least partially elliptical barrier and a second plurality of legs, the second plurality of legs extending from the bottom piece; aligning a second aperture defined by a top piece over the first aperture; and extending a fastener through the second aperture and the first aperture, thereby clamping the top piece to the bottom piece, wherein the first aperture is located centrally within the at least partially elliptical barrier.

Clause 19. The method of clause 18, wherein the top piece comprises a protrusion configured to be received at least partially in the at least partially elliptical barrier of the bottom piece, the second aperture being defined in the protrusion.

Clause 20. The method of clause 18 or 19, further comprising the step of: inserting the fastener into a third aperture defined in the rail, thereby securing the top and bottom pieces to the rail.

DETAILED DESCRIPTION OF THE INVENTION

Figure 1:
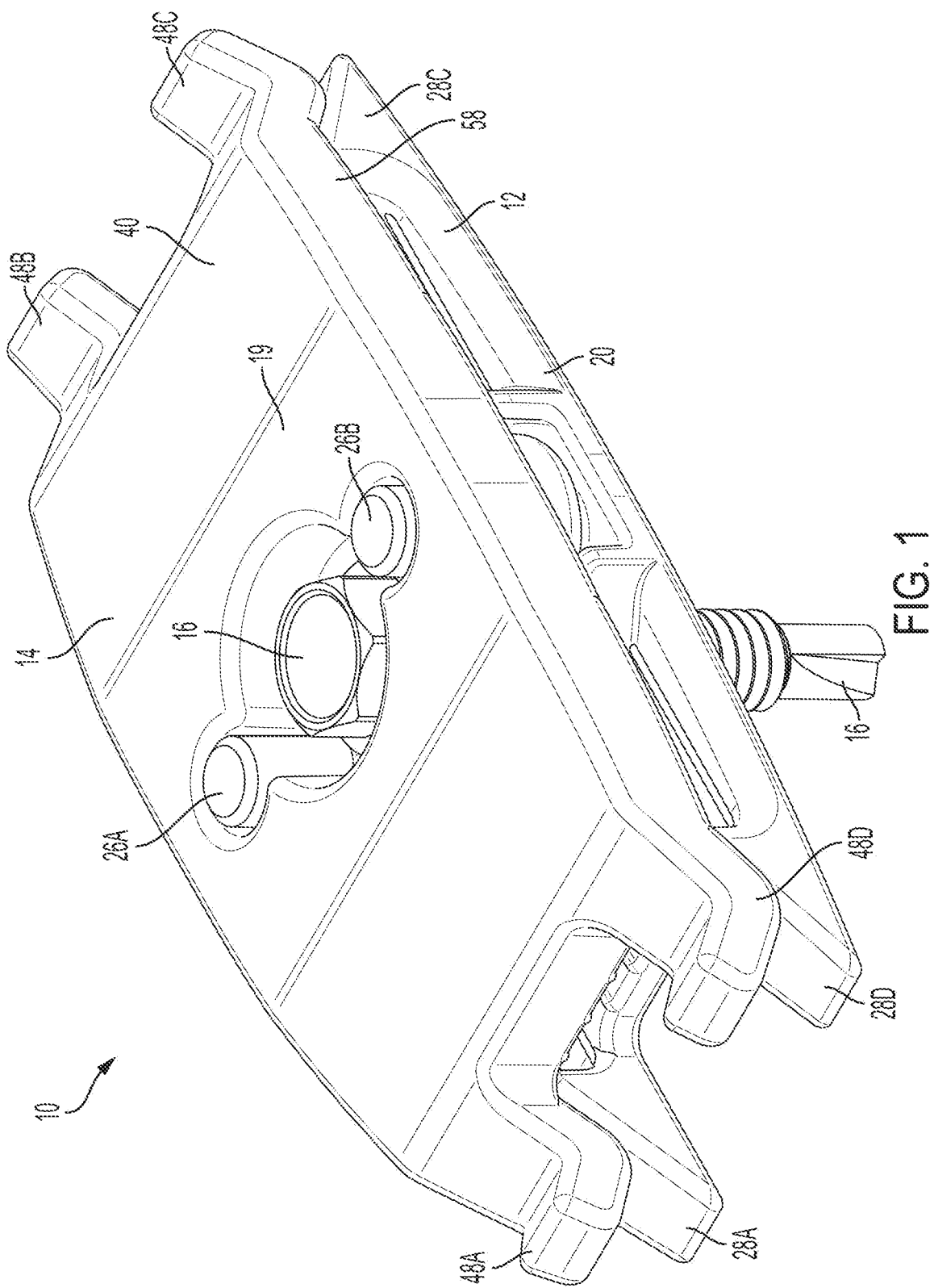
FIG. 1 is a perspective view of a wire clamp according to one non-limiting embodiment of the present disclosure.

As used herein, the singular forms of "a", "an", and "the" include plural referents unless the context clearly dictates otherwise.

Spatial or directional terms, such as "left", "right", "inner", "outer", "above", "below", and the like, relate to the disclosure as shown in the drawing figures and are not to be considered as limiting as the disclosure can assume various alternative orientations.

For purposes of the description hereinafter, the terms "upper", "lower", "right", "left", "vertical", "horizontal", "top", "bottom", "lateral", "longitudinal", and derivatives thereof shall relate to the disclosure as it is oriented in the figures. However, it is to be understood that the disclosure may assume alternative variations and step sequences, except where expressly specified to the contrary. It is also to be understood that the specific devices and processes illustrated in the attached drawings and described in the following specification are simply exemplary aspects of the disclosure. Hence, specific dimensions and other physical characteristics related to the aspects disclosed herein are not to be considered as limiting.

The terms "first", "second", and the like are not intended to refer to any particular order or chronology, but refer to different conditions, properties, or elements.

The term "at least" is synonymous with "greater than or equal to".

The term "includes" is synonymous with "comprises".

The present disclosure is directed, in general, to a wire clamp 10 designed to be mounted to a rail R (shown in FIG. 8) and used to organize and arrange wires in various industrial environments, such as in a solar panel array. Certain aspects of the wire clamp 10 are shown in FIGS. 1-8.

Figure 2:
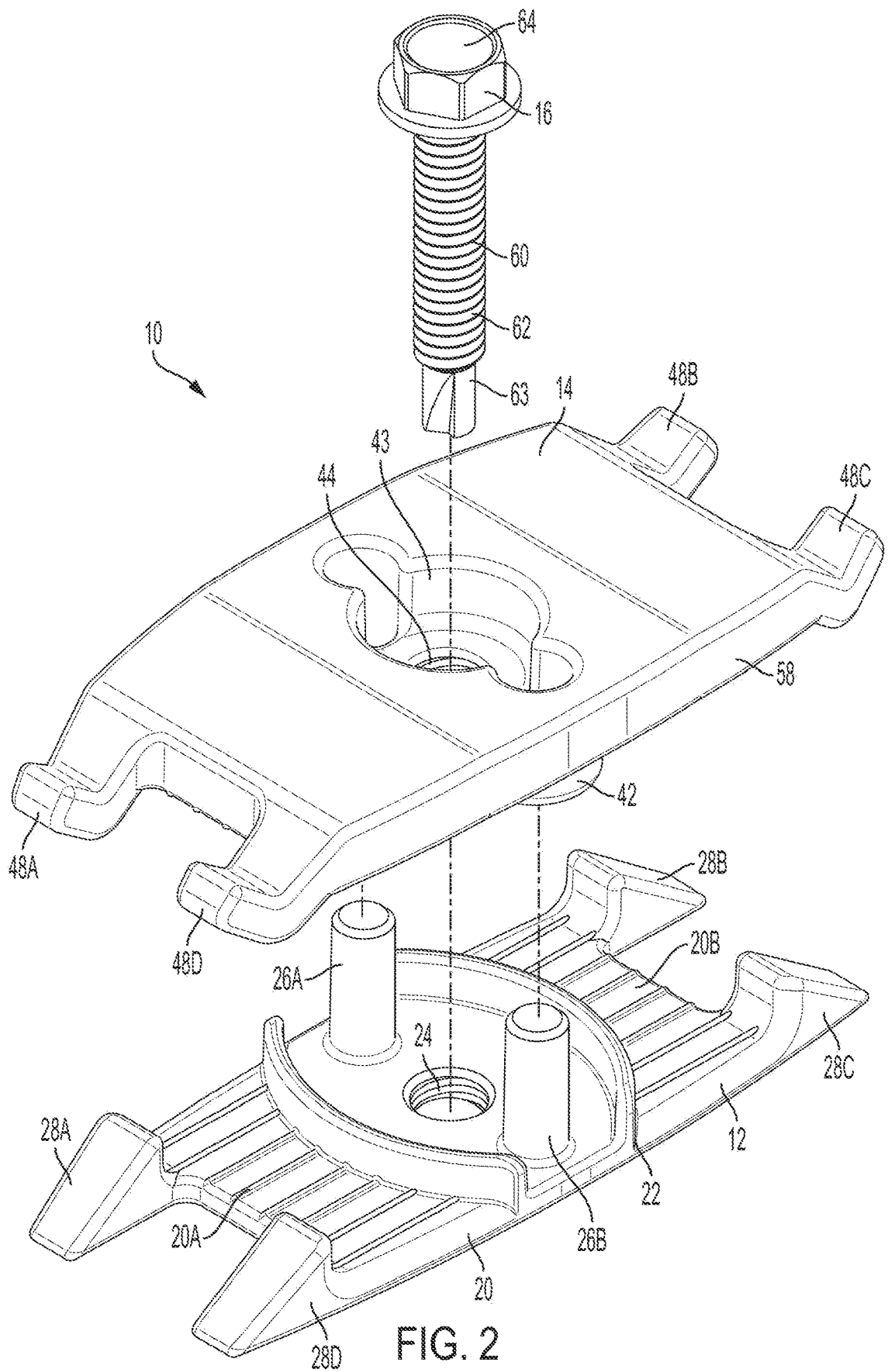
FIG. 2 is an exploded view of the wire clamp of FIG. 1.

With reference to FIGS. 1 and 2, the wire clamp 10 includes a bottom piece 12 and a top piece 14. The bottom piece 12 and top piece 14 are joined together via a screw 16. While a screw 16 is shown, other fastening means known to those having skill in the art may be used. Both the bottom piece 12 and the top piece 14 are generally rectangular and complementary in shape so that the pieces 12, 14, when connected via the screw 16, define channels 32A, 32B (shown in FIGS. 2, 3, 5, 6, and 8) for routing and clamping wires W (shown in FIGS. 5-8) therethrough. It is understood that the bottom piece 12 and the top piece 14 may take other shapes, so long as they fit together to define a channel or channels for the wires W.

Figure 3:
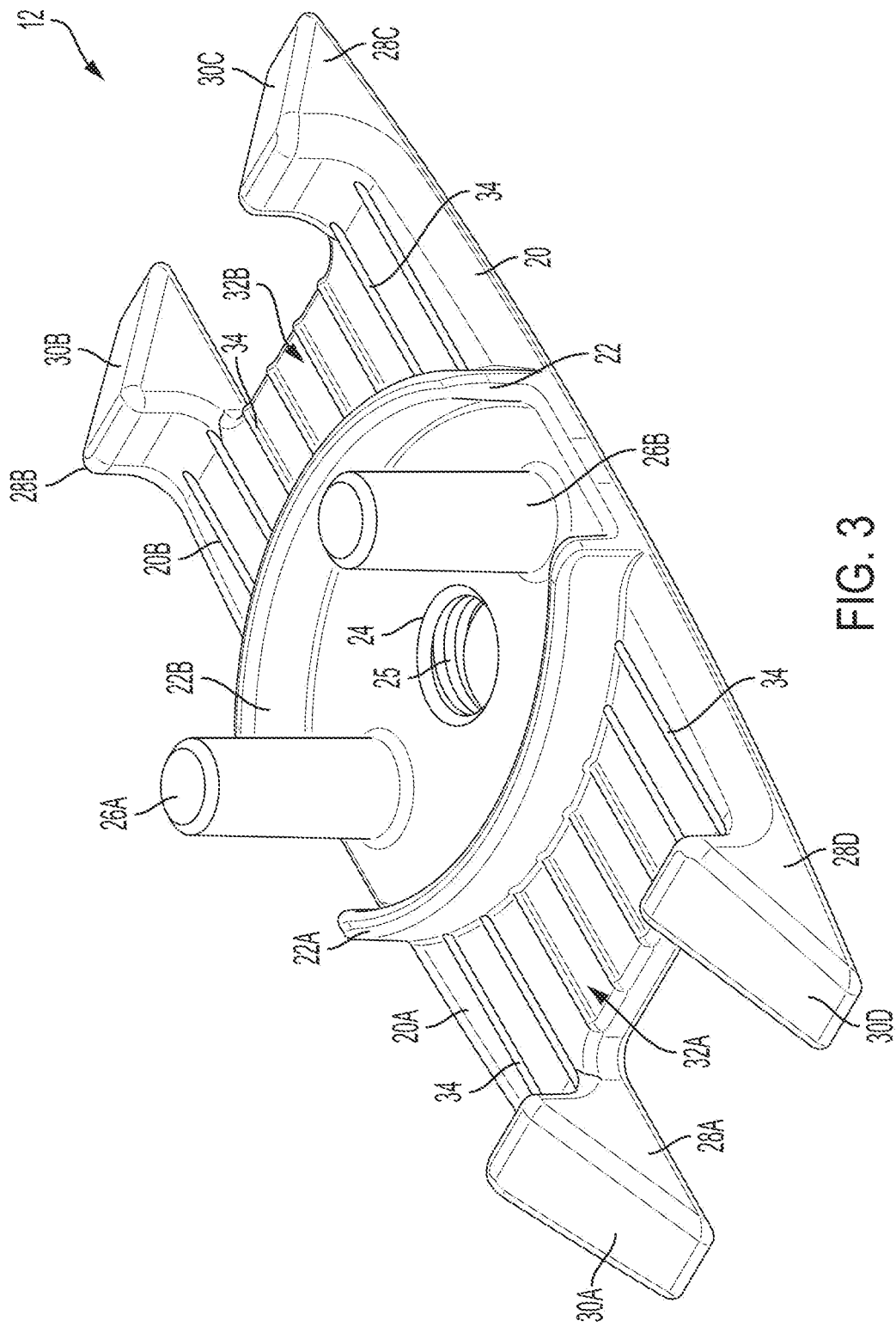
FIG. 3 is a perspective view of a bottom piece of the wire clamp of FIG. 1.

With reference to FIGS. 1-3, the bottom piece 12 will now be described. The bottom piece 12 includes a first base 20. The first base 20 is divided into a first side 20A and a second side 20B, which are separated by a barrier 22. As shown, the barrier 22 is partially elliptical, having two sidewalls 22A, 22B curving about an aperture 24. The sidewalls 22A, 22B define a shape that is similar to that of a football. Such a shape allows a user to maximize the bend radius of the wires that run through the clamp 10. The first sidewall 22A extends along and serves as a demarcation line of the first side 20A. The second sidewall 22B extends along and serves as a demarcation line of the second side 20B. The sidewalls 22A, 22B are curved to prevent the wires W from being pinched together when the top piece 14 is connected to the bottom piece 12. The curved sidewalls 22A, 22B also cause the wires W to curve when placed in the bottom piece 12, which may allow for more efficient and organized routing of the wires W in the system to which the wire clamp 10 is applied. The curvature also prevents pinching or unnecessary bunching of the wires W, which can lead to entanglements. While shown as an elliptical or football-like shape, the sidewalls 22A, 22B may take different rounded shapes, such as an ovular or circular shape, in order to properly orient the wires W within the wire clamp 10.

Located centrally relative to the two sidewalls 22A, 22B of the barrier 22 is the aperture 24 that receives the screw 16 therein. The aperture 24 may have threads 25 that correspond to threads 62 on the screw 16 to facilitate the connection therebetween. The space between the sidewalls 22A, 22B and around the aperture 24 may be smooth and includes two posts 26A, 26B extending upward from the first base 20. The posts 26A, 26B are received within corresponding holes 46A, 46B in the top piece 14 (shown in FIG. 4). The posts 26A, 26B serve to help orient the bottom piece 12 and the top piece 14 during their connection. The posts 26A, 26B also add additional points of engagement between the bottom piece 12 and the top piece 14, which helps ensure the pieces 12, 14 remain together and in the correct relative orientation when in use.

The bottom piece 12 also includes legs 28A, 28B, 28C, 28D extending proximate the corners of the first base 20. The legs 28A, 28B, 28C, 28D extend outward from the corners, with two legs 28A, 28D, extending in one direction from the first base 20, and the other two legs 28B, 28C, extending in an opposing direction. The legs 28A, 28B, 28C, 28D are generally wedge shaped and include sloped outer surfaces 30A, 30B, 30C, 30D. The slopes of these surfaces 30A, 30B, 30C, 30D extend in the same direction as the legs 28A, 28B, 28C, 28D extend away from the first base 20. While the sidewalls 22A, 22B demarcate one side of the base's 20 sides 20A, 20B, the legs 28A, 28B, 28C, 28D demarcate the opposing side. In particular, legs 28A, 28D oppose sidewall 22A, and legs 28B, 28C oppose sidewall 22B. The opposing nature of these elements at least partially defines wire channels 32A, 32B, with sidewall 22A and legs 28A, 28D defining a first wire channel 32A therebetween and sidewall 22B and legs 28B, 28C defining a second wire channel 32B there between. The sloped nature of the legs 28A, 28B, 28C, 28D ensures that the portions of the legs 28A, 28B, 28C, 28D facing their respective sidewalls 22A, 22B are high enough to retain the wires W in their respective channels 32A, 32B. As a result of these features, the shapes of the legs 28A, 28B, 28C, 28D can be anything that is large enough to retain the wires W in the channels 32A, 32B. Within the channels 32A, 32B, the sides 20A, 20B include ridges 34 (not all labeled for clarity). The ridges 34 provide a corrugated surface on the sides 20A 20B that can help align the wires W within the channels 32A, 32B. The corrugation of the ridges 34 also creates some friction that helps retain the wires W in their specific location within the channels 32A, 32B.

Figure 4:
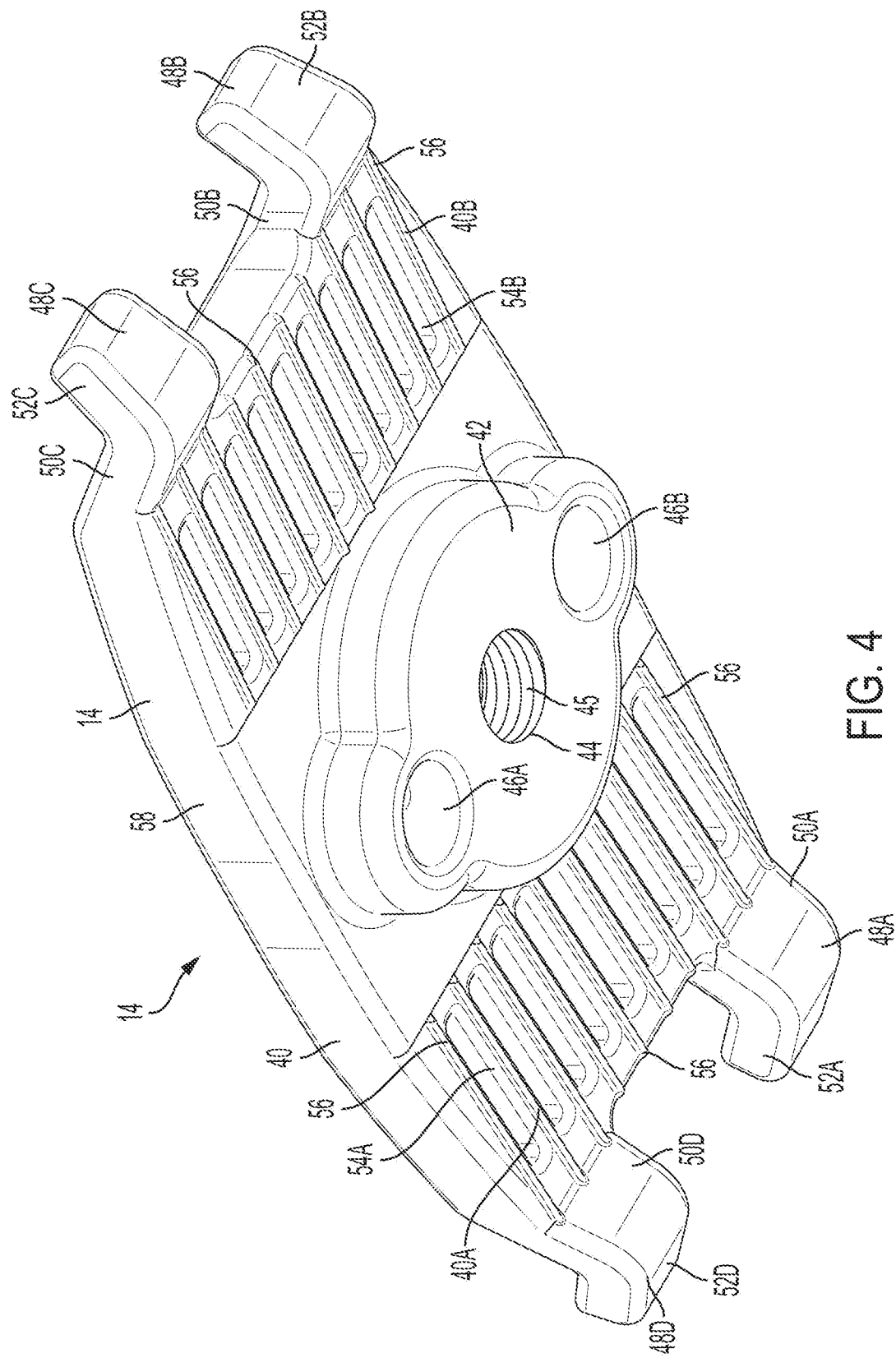
FIG. 4 is a perspective view of a top piece of the wire clamp of FIG. 1.
Figure 5:
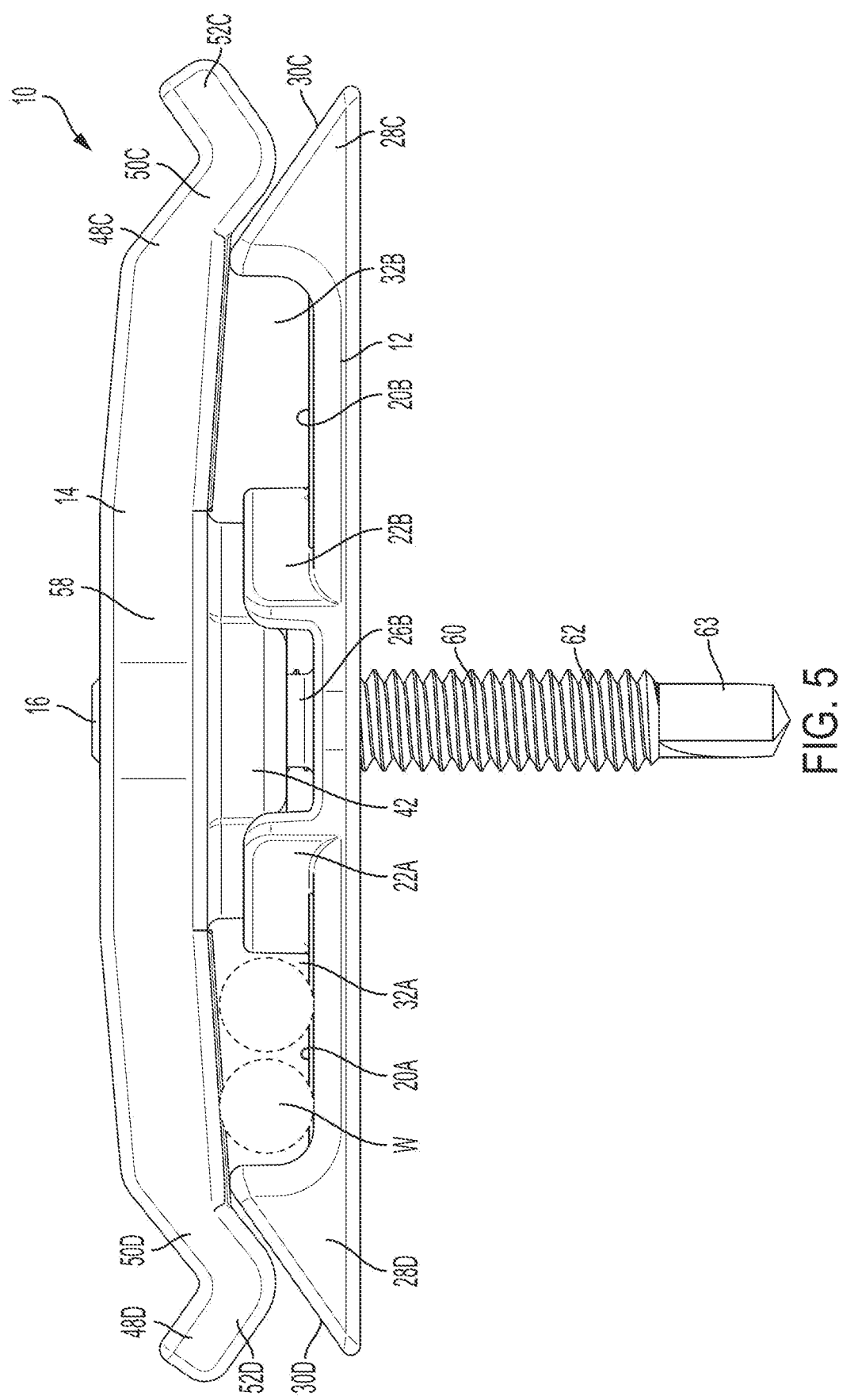
FIG. 5 is a side view of the wire clamp of FIG. 1.
Figure 6:
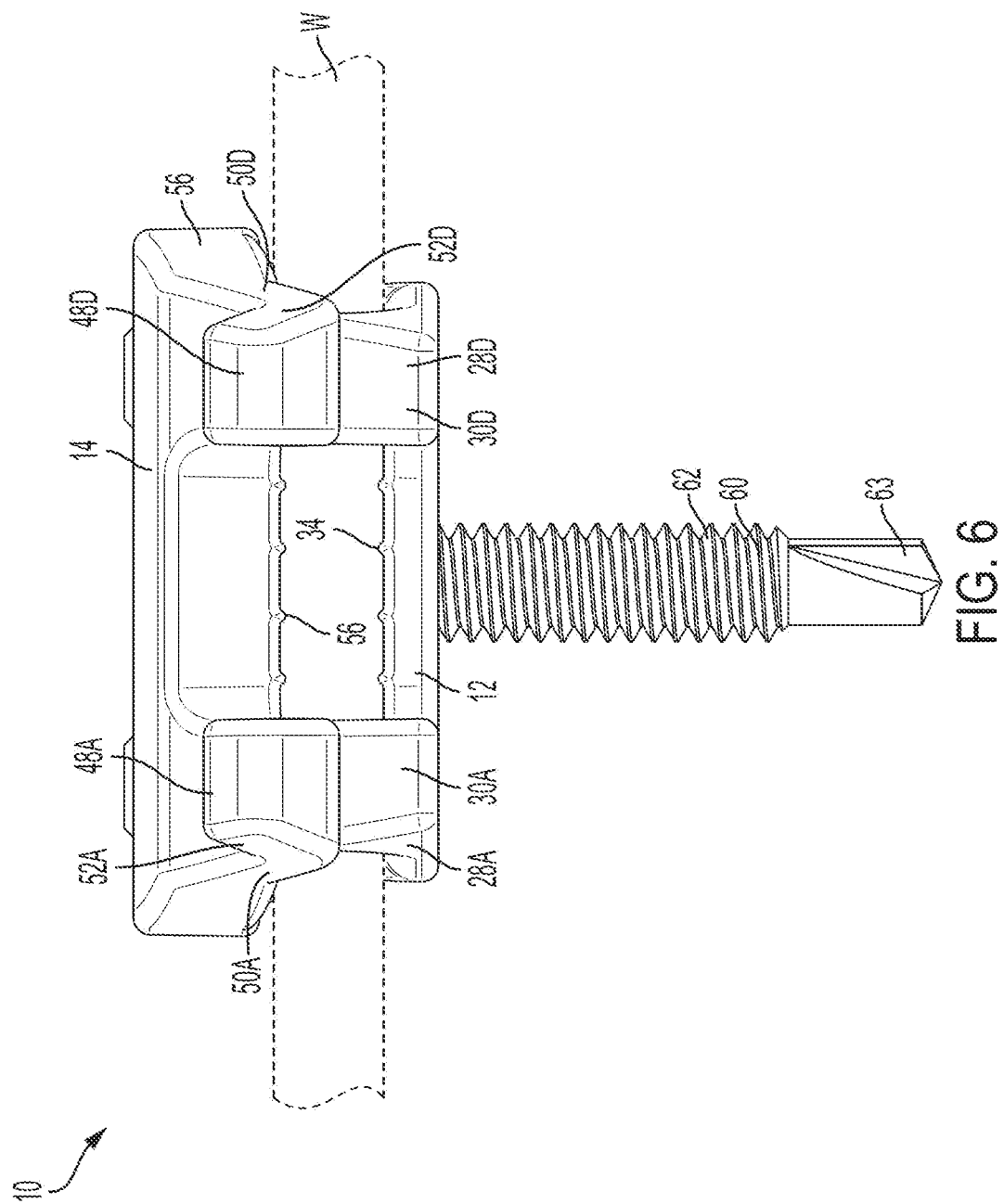
FIG. 6 is another side view of the wire clamp of FIG. 1.
Figure 7:
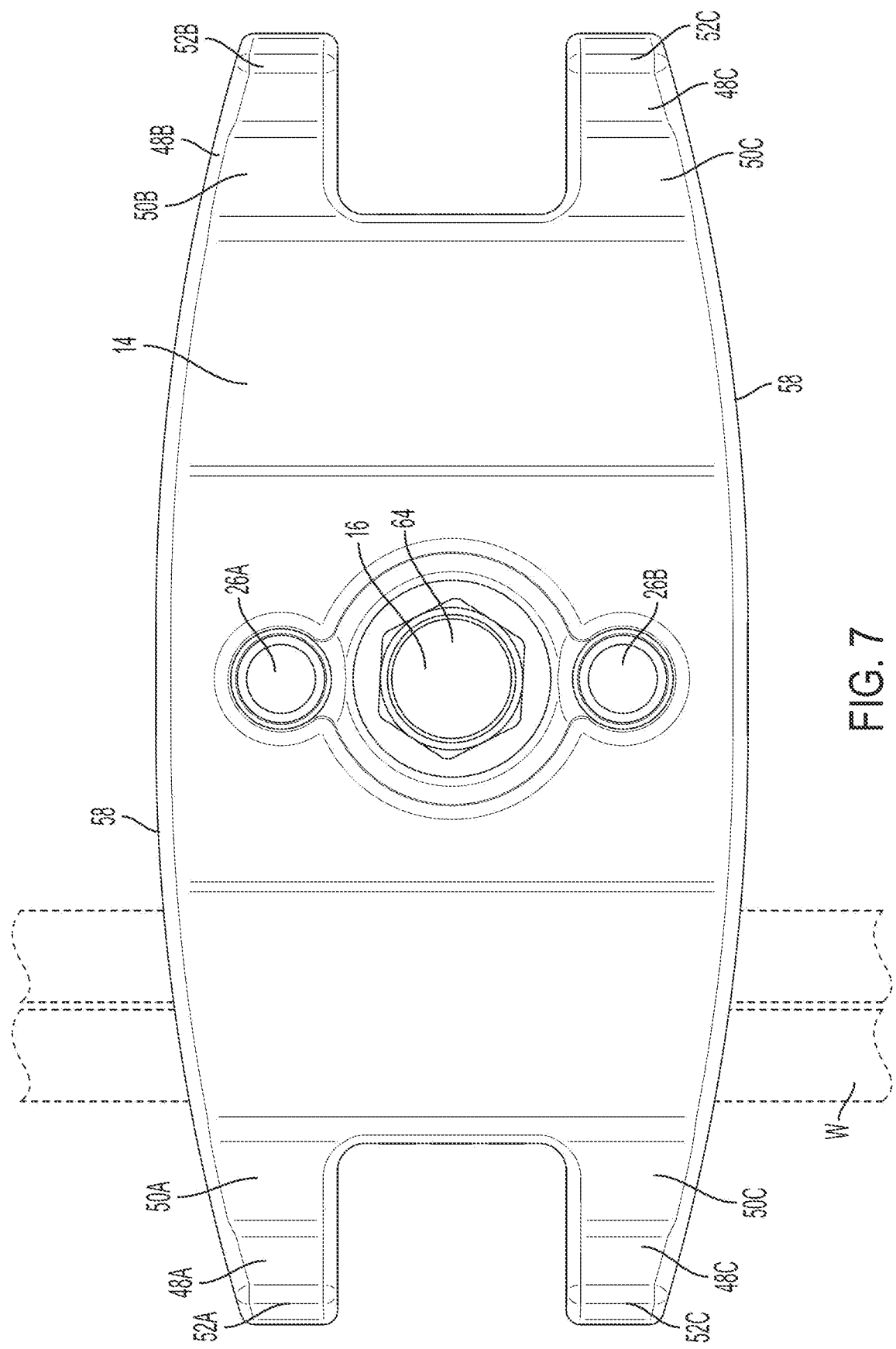
FIG. 7 is a top view of the wire clamp of FIG. 1.

With reference to FIGS. 1, 2, and 4, the top piece 14 will now be described. The top piece 14 also includes a base 40 with a first side 40A and a second side 40B. The sides 40A, 40B are divided by a central portion 40C that includes a protrusion 42 extending therefrom. As the protrusion 42 extends in the direction of the bottom piece 12, it defines a cavity 43 in the top surface 19 of the top piece 14. The protrusion 42 is rounded and shaped so as to at least partially complement the curved sidewalls 22A, 22B of the bottom piece 12. The protrusion 42 includes an aperture 44 and holes 46A, 46B that respectively align with aperture 24 and posts 26A, 26B of the bottom piece 12. The aperture 44 may include threads 45 that correspond to threads 62 on the screw 16 and, along with the alignment of the holes 46A, 46B and posts 26A, 26B, serve to orient and connect the top piece 14 to the bottom piece 12. Based on these alignments, the protrusion 42 is shaped to fit within the space defined within the curved sidewalls 22A, 22B. As shown, the protrusion 42 is rounded, having three different partial circles extending downward, one circle defines the aperture 44 and the two other circles define the holes 46A, 46B. It is understood that different shapes can be used, so long as the protrusion 42 allows for the alignments discussed herein. It is also to be understood that the arrangement of the features associated with the protrusion 42 and the features associated with the partially elliptical barrier 22 can be reversed. In this instance, the top piece 14 may include the curved sidewalls 22A, 22B and posts 26A, 26B, and the bottom piece 12 may include the protrusion 42 and holes 46A, 46B.

The top piece 14 also includes flanges 48A, 48B, 48C, 48D extending proximate the corners of the second base 40. The flanges 48A, 48B, 48C, 48D correspond with and are aligned over the legs 28A, 28B, 28C, 28D of the bottom piece 12 when the wire clamp 10 is assembled. The flanges 48A, 48B, 48C, 48D are angled both downward and upward relative to the second base 40. This means that the flanges 48A, 48B, 48C, 48D include downward extending portions 50A, 50B, 50C, 50D, that, when the wire clamp 10 is assembled, contact at least a portion of the sloped surfaces 30A, 30B, 30C, 30D, of the legs 28A, 28B, 28C, 28D. Extending from the downward extending portions 50A, 50B, 50C, 50D are upward extending portions 52A, 52B, 52C, 52D extending away from the sloped surfaces 30A, 30B, 30C, 30D of the legs 28A, 28B, 28C, 28D. The upward extending portions 52A, 52B, 52C, 52D provide areas of the top piece 14 that can be easily gripped to remove the top piece 14 from the bottom piece 12.

Figure 8A:
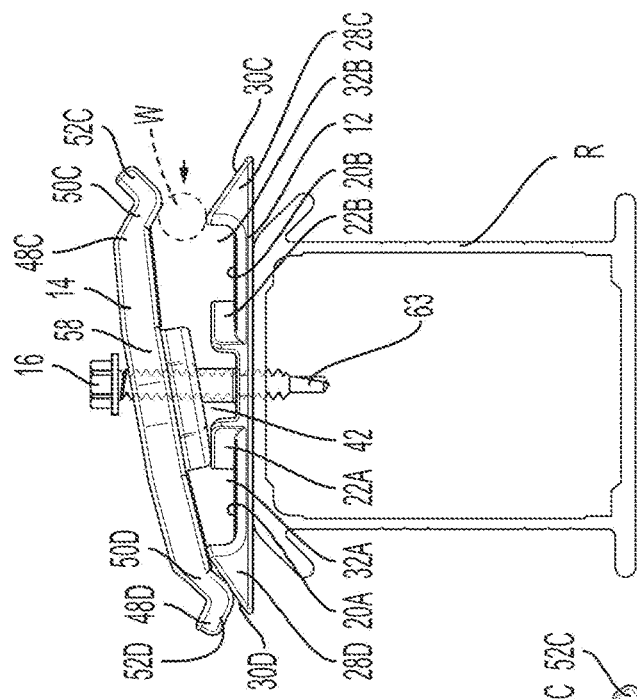
FIG. 8A is a side view of a wire clamp showing the process of placing a wire therein according to one non-limiting embodiment of the present disclosure.
Figure 8C:
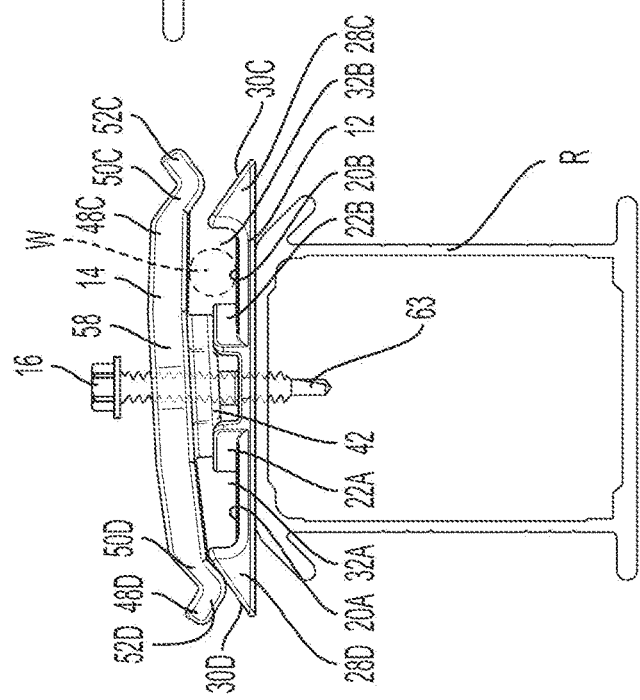
FIG. 8C is another side view of the wire clamp of FIG. 8A showing the process of placing a wire therein.
Figure 8B:
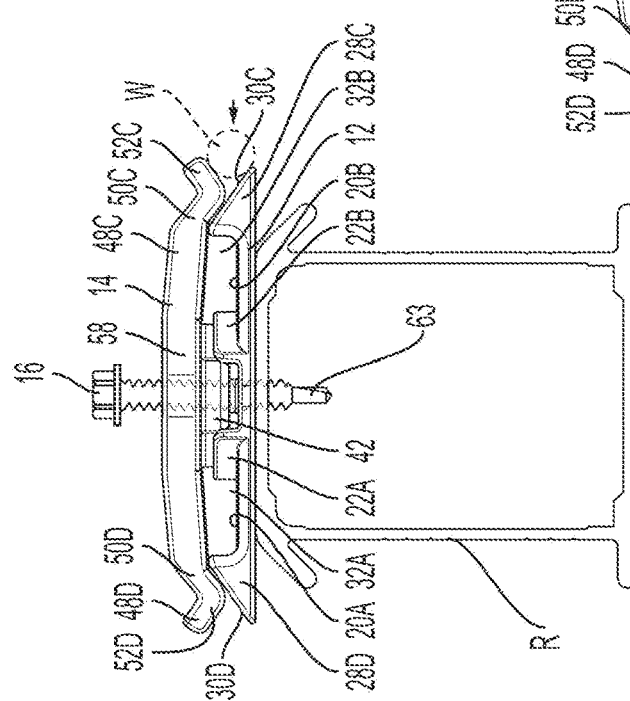
FIG. 8B is a side view of the wire clamp of FIG. 8A showing the process of placing a wire therein.

The lower surface of upwardly extending portions 52A, 52B, 52C, 52D slope upward and away from the sloped outer surfaces 30A, 30B, 30C, 30D of the legs 28A, 28B, 28C, 28D of the bottom piece 12. Thus the sloping surfaces of the upper and lower pieces extend outward and away from each other, such that they may touch or almost touch at the portions closest to the center of the wire clamp 10 where the legs define the outermost border of the wire channels 32A and 32B and as the legs 28A, 28B, 28C, 28D, and the upwardly extending portions 52A, 52B, 52C, 52D extend outward from the center of the wire clamp 10 the sloping surfaces open away from each other creating a mouth or opening. This mouth or opening can assist in guiding wires W into the channels 32A, 32B and in separating the bottom piece 12 and the upper piece 14 to allow the wires W to enter into the channels 32A, 32B. Such an action is shown in FIGS. 8A-8C and discussed in greater detail below The sides 40A, 40B of the top piece 14 also serve as channel walls 54A, 54B. The channel walls 54A 54B further define the wire channels 32A, 32B along with the sidewalls 22A, 22B and legs 28A, 28B, 28C, 28D of the bottom piece 12. The channel walls 54A, 54B may contact the tops of the wires W upon the assembly of the wire clamp 10, or the sizing of the top piece 14 and the bottom piece 12 may be such that a small space may be provided between the channel walls 54A, 54B and the wires W when the clamp 10 is assembled. The channel walls 54A, 54B may also include ridges 56 to provide similar corrugation benefits as the ridges 34 of the bottom piece. The shape and sizing of both sets of ridges 34, 56 allows for a variety of wires W to be gripped and secured within the wire channels 32A, 32B. The arrangement shown also allows for wires W of different sizes to be received and secured within the wire channels 32A 32B. Finally, the top piece 14 is arched over the bottom piece 12, having a curved sidewall 58 that arches over the first base 20 of the bottom piece 12. This shape allows for the wires to fit snugly and safely within the channels 32A, 32B when the top piece 14 is mated with and connected to the bottom piece 12.

With reference to FIGS. 1, 2, and 5-8, the screw 16 includes an extension 60 having threads 62 thereon to mate with the threads 25, 45 of the bottom piece 12 and the top piece 14. A head 64 of the screw 16 is sized and shaped to rest within the indentation 43 when applied to the top piece 14. Fully assembled wire clamps are shown in FIGS. 5-8. To assemble these wire clamps 10, wires W are placed in the wire channels 32A, 32B as defined by only the curved sidewalls 22A, 22B and legs 28A, 28B, 28C, 28D of the bottom piece 12 and aligned in the desired manner. Then, the top piece 14 is placed above and aligned with the bottom piece 12, meaning that the protrusion 42 is aligned within the curved sidewalls 22A, 22B and the holes 46A, 46B are aligned with the posts 26A, 26B. Then the top piece 14 is connected to the bottom piece 12 by having the protrusion 42 received within the barrier 22 and the posts 26A, 26B received within the holes 46A, 46B. Then the screw 16 can be placed through and engaged with the apertures 24, 44 of the bottom and top pieces 12, 14.

Figure 9:
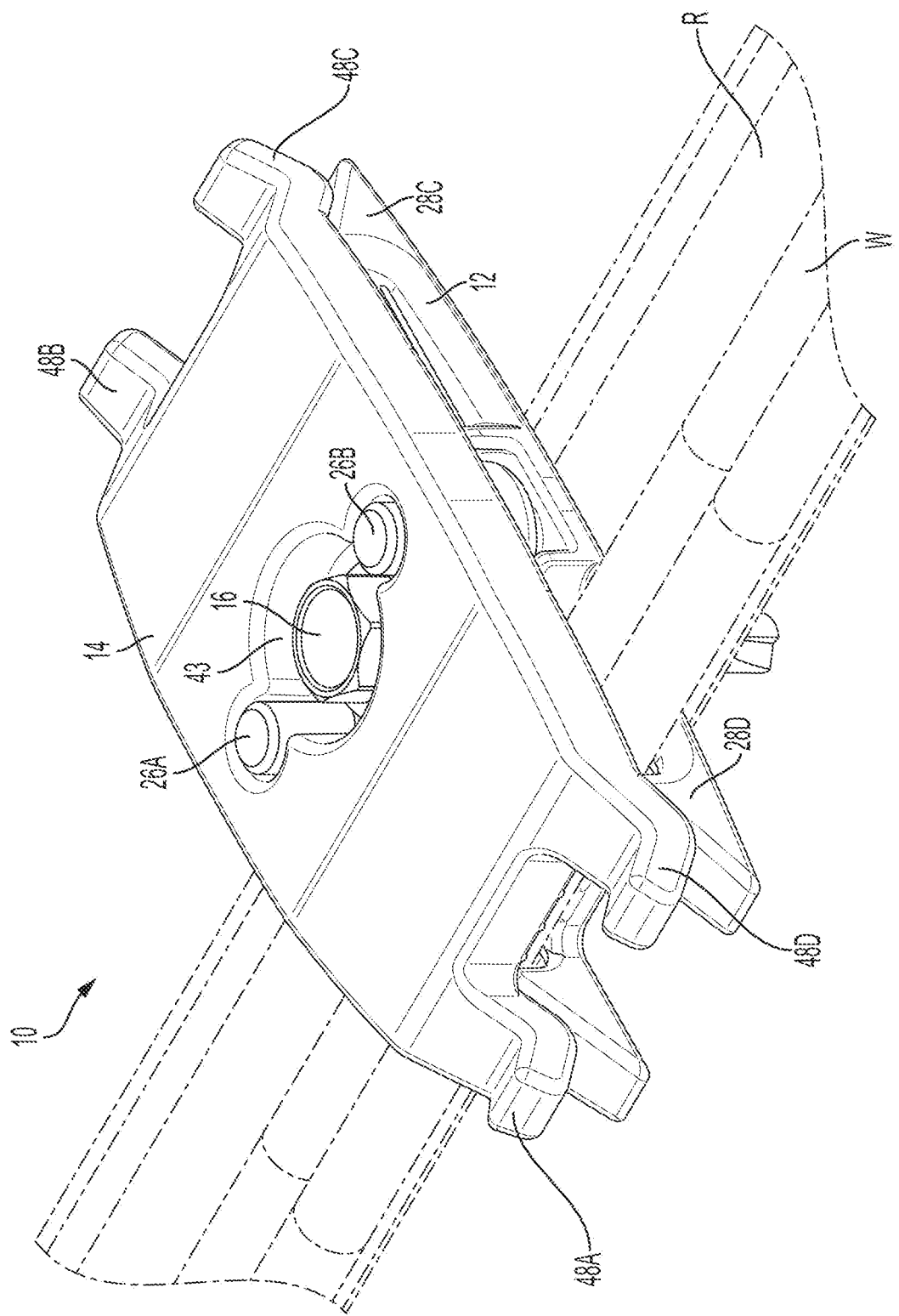
FIG. 9 is a perspective view of the wire clamp of FIG. 1 mounted to a rail.

As shown in FIGS. 8A-9, the wire clamp 10 can be applied to a rail R used in an industrial environment, such as a solar panel array. To apply the wire clamp 10 to the rail R, or to whatever element the wire clamp 10 is being applied, the rail R may include an aperture to receive the screw 16 therein. The screw 16 may also be self-tapping, as discussed below. In such an embodiment the rail R may not initially include an aperture. The aperture in the rail R may be formed by a drill tip 63 on the screw. This aperture may also include threads that correspond to the threads 62 on the screw 16. To apply the wire clamp 10 to the rail, the wire clamp 10 can be assembled as previously described and then the threads 62 of the screw 16 can engage with and connect to the aperture of the rail R. In another method of assembly, the aperture 24 of the bottom piece 12 is aligned with the aperture of the rail R. Then the wires W can be placed within the wire channels 32A, 32B, and the top piece 14 can be applied to the bottom piece 12 as previously described. Then the screw 16 can be applied through each aperture to secure the wire clamp 10 and attach it to the rail R.

In a preferred embodiment the screw 16 includes the drill tip 63 at the distal end of the extension 60 and screw 16 is effectively a self-drilling self-tapping screw. This enables the wire clamp 10 to be located, placed, and installed at any appropriate location along the rail or other installation surface. Another method of assembly is that the top piece 14 and the bottom piece 12 can be assembled loosely with the posts 26A, 26B extending into the holes 46A, 46B and the protrusion 42 extending between the sidewalls 22A, 22B. The wires W can be inserted into channels 32A, 32B. The screw 16 can be inserted through aperture 24, 44. then the assembly can be placed on an installation surface such as a rail top surface and the self-drilling, self-tapping screw 16 can be driven into the installation surface until the entire wire clamp 10 assembly is tightened and fixed onto the installation surface.

The orientation of the top piece 14 and the bottom piece 12 relative to each other is fixed by the interlocking relationship of the posts 26A, 26B and the holes 46A, 46B and well as the interlocking relationship between the protrusion 42 and the recessed area between the sidewalls 22A, 22B. The assembled wire clamp 10 allows for the top and bottom pieces 14, 12 to freely rotate around the screw 16. The wire clamp can be installed in any orientation on an installation surface. For instance the wire clip 10 can be installed on top of a rail R such that the wires extend perpendicular to the longitudinal axis of the rail, parallel to the longitudinal axis of the rail or at any angle in between. This provides maximum flexibility to an installer who is running wires in a solar array and must get the wires across a distance on a roof or other installation environment while preventing the wires from sagging and touching the roof or other surface.

The apertures 24, 44 may be clearance holes without including threads. The wire clamp 10 can be assembled and installed on an installation surface without fully tightening the screw 16. Then the wires can be inserted through the mouth or opening between the upward extending portions 52A, 52B, 52C, 52D of the top piece 14 and the legs 28A, 28B, 28C, 28D of the bottom piece 12 as is shown in FIGS. 8A-8C. In such an arrangement, the flanges 48A, 48B, 48C, 48D located at one end of the top piece 14 (i.e., flanges 48A, 48D or flanges 48B, 48C) can be pulled upward to create a space between the respective flanges 48A, 48B, 48C, 48D and their corresponding legs 28A, 28B, 28C, 28D so that a wire W can fit between that space to be placed in the desired wire channel 32A, 32B.

The channels 32A, 32B are curved as a result of the elliptical shape of barrier 22. The peripheral edges of the first base 20 and the inside vertical portions of the legs 28A, 28B, 28C, 28D are radiused. These features allow the wires W to enter and exit the channels 32A, 32B at an angle or bending in a non-orthogonal direction without risk of damage to the wires W or wire insulation.

While various aspects of the wire clamp 10 were provided in the foregoing description, those skilled in the art may make modifications and alterations to these aspects without departing from the scope and spirit of the invention. For example, it is to be understood that this disclosure contemplates that, to the extent possible, one or more features of any aspect can be combined with one or more features of any other aspect. Accordingly, the foregoing description is intended to be illustrative rather than restrictive. The invention described hereinabove is defined by the appended claims, and all changes to the invention that fall within the meaning and the range of equivalency of the claims are to be embraced within their scope.

The invention claimed is:

1. A wire clamp comprising:
a bottom piece comprising:
a first base portion defining a first aperture;
an at least partially elliptical barrier extending from the first base portion around and spaced from the first aperture; and
a plurality of legs extending from sides of the base portion;
a top piece comprising:
a second base portion;
a protrusion extending from the second base portion, the protrusion defining a second aperture; and
a plurality of flanges extending from sides of the second base portion; and
a fastener,
wherein the first aperture and the second aperture are configured to align and receive the fastener therethrough, and
wherein a first side of the at least partially elliptical barrier, the first base portion, and a first portion of the plurality of legs define a first wire channel.

2. The wire clamp of claim 1, wherein segments of the first base portion extending between the at least partially elliptical barrier and the plurality of legs are ridged.

3. The wire clamp of claim 1, wherein the top piece is at least partially arched about the bottom piece.

4. The wire clamp of claim 1, wherein the plurality of legs are sloped in a direction away from the top piece and extend in a direction away from the first base portion.

5. The wire clamp of claim 1, wherein the flanges comprise a first portion that is sloped downward in a direction extending away from the second base portion and a second portion that is sloped upward relative to the first portion.

6. The wire clamp of claim 1, wherein the plurality of flanges correspond to and extend at least partially over the plurality of legs.

7. The wire clamp of claim 1, wherein a second side of the at least partially elliptical barrier and a second portion of the plurality of legs define a second wire channel.

8. The wire clamp of claim 7, wherein the first wire channel and the second wire channel are further defined by the second base portion.

9. The wire clamp of claim 1, wherein the protrusion is at least partially received within the at least partially elliptical barrier.

10. The wire clamp of claim 9, wherein the protrusion defines a third aperture and a fourth aperture,
wherein the bottom piece further comprises a first post and a second post extending from the first base portion, and
wherein the first post and the second post are configured to be received within the third aperture and the fourth aperture.

11. The wire clamp of claim 10, wherein the first post and the second post are disposed symmetrically about the first aperture.

12. A method of clamping wires using the wire clamp of claim 1, the method comprising the steps of:
placing first wires within the first wire channel of the bottom piece, the first wire channel being defined by the first side of the at least partially elliptical barrier and a first set of the plurality of legs;
placing second wires within a second wire channel of the bottom piece, the second wire channel being defined by a second side of the at least partially elliptical barrier and a second set of the plurality of legs;
aligning the second aperture defined by the top piece over the first aperture; and extending the fastener through the second aperture and the first aperture, thereby clamping the top piece to the bottom piece, wherein the first aperture is located centrally within the at least partially elliptical barrier.

13. The method of claim 12, wherein the top piece comprises the protrusion configured to be received at least partially in the at least partially elliptical barrier of the bottom piece, the second aperture being defined in the protrusion.

14. The method of claim 12, further comprising the step of: inserting the fastener into a third aperture defined in a rail, thereby securing the top and bottom pieces to the rail.

15. A wire routing system comprising:
a rail and
a wire clamp comprising:
  a bottom piece comprising:
    a first base portion defining a first aperture;
    an at least partially elliptical barrier extending from the first base portion around and spaced from the first aperture; and
    a plurality of legs extending from sides of the first base portion;
  a top piece comprising:
    a second base portion; and
    a protrusion extending from the second base portion, the protrusion defining a second aperture; and
a self-tapping fastener configured to define a third aperture in the rail, wherein the first aperture, the second aperture, and the third aperture are configured to align and receive the fastener therethrough, thereby mounting the wire clamp to the rail, and wherein a first side of the at least partially elliptical barrier, a first portion of the plurality of legs, and at least a portion of the first base portion define a first wire channel, and a second side of the at least partially elliptical barrier, a second portion of the plurality of legs, and at least a second portion of the first base portion define a second wire channel.

16. The wire routing system of claim 15, wherein segments of the first base portion extending between the at least partially elliptical barrier and the plurality of legs are ridged.

17. The wire routing system of claim 15, wherein the top piece is at least partially arched about the bottom piece.

18. The wire routing system of claim 15, wherein the plurality of legs are sloped in a direction away from the top piece and extend away from the first base portion.

19. The wire routing system of claim 15, wherein the protrusion is at least partially received within the at least partially elliptical barrier.

20. The wire routing system of claim 19, wherein the protrusion defines a fourth aperture and a fifth aperture, wherein the bottom piece further comprises a first post and a second post extending from the first base portion, and wherein the first post and the second post are configured to be received within the fourth aperture and the fifth aperture.

* * * * *